P. H. OWENS.
HOSE-CONNECTIONS FOR FIRE-ENGINES.
No. 183,699. Patented Oct. 24, 1876.
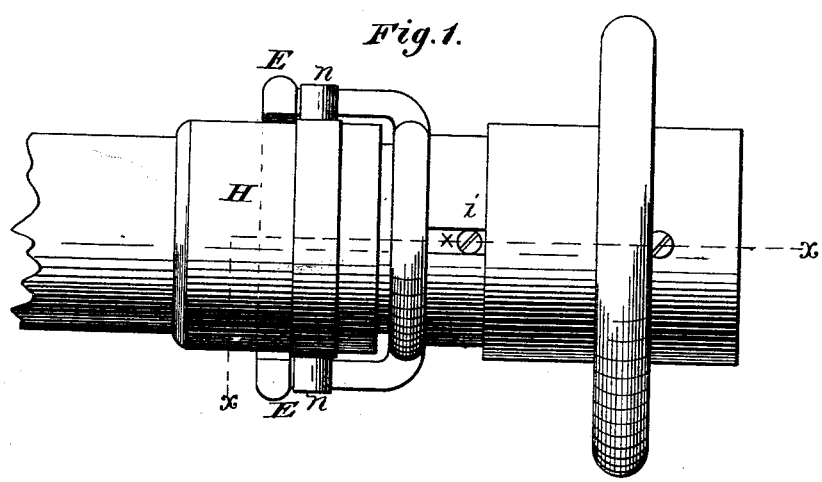
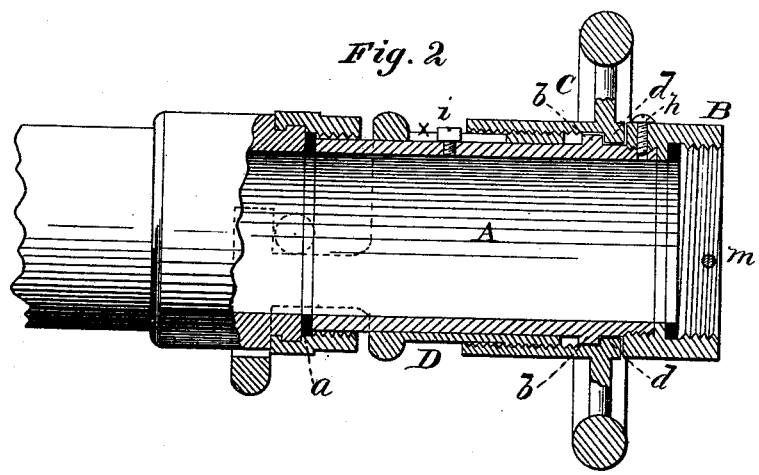
WITNESSES
Henry N. Miller
Franck L. Durand
INVENTOR
Patrick H. Owens.
Alexander V. Mason
ATTORNEYS

UNITED STATES PATENT OFFICE.

PATRICK H. OWENS, OF TOLEDO, OHIO.

IMPROVEMENT IN HOSE-CONNECTIONS FOR FIRE-ENGINES.

Specification forming part of Letters Patent No. 183,699, dated October 24, 1876; application filed September 16, 1876.

*To all whom it may concern:*

Be it known that I, PATRICK H. OWENS, of Toledo, in the county of Lucas, and in the State of Ohio, have invented certain new and useful Improvements in Hose-Connection for Fire-Engines; and do hereby declare that the following is a full, clear, and exact description thereof, reference being had to the accompanying drawings, and to the letters of reference marked thereon, making a part of this specification.

The nature of my invention consists in the construction and arrangement of a coupling for connecting hose to fire-engines, hydrants, &c., as will be hereinafter more fully set forth.

In order to enable others skilled in the art to which my invention appertains to make and use the same, I will now proceed to describe its construction and operation, referring to the annexed drawing, in which—

Figure 1 is a top view of my invention, and Fig. 2 is a longitudinal section of the same.

This coupling is composed of four pieces or parts—viz., a cylinder, A, which forms the water-way inside; a collar, B, screwed upon one end to form the connection to the engine or hold the wheel-nut C in place; a sleeve, D, sliding over the cylinder A, and provided with hooks E E, or a clutch to receive the hose-coupling; and a wheel-nut, C, for drawing the coupling up to form a joint upon the packing $a$ in the hose-coupling.

The cylinder A is provided with a circumferential collar or flange, $b$, near one end, to hold the wheel-nut C from drawing down over the cylinder by means of a flange, $d$, on the inside of said wheel-nut, which two flanges come together, as shown in Fig. 2, and when the collar B is screwed upon the end outside of the wheel-nut, it forms a perfect swivel-joint for the nut, holding it in its place. The sliding sleeve D, with hooks or clutch E, is then slipped over the cylinder and screwed inside the swivel-nut.

A small screw, $i$, is placed in the slot $x$ in the sleeve D, and screwed solid into the cylinder A, which prevents the sleeve from turning when the swivel-nut is revolved. A small screw, $h$, is also inserted in the collar B, as a set-screw to keep the same from unscrewing. Another set-screw, $m$, is put in said collar to hold the same to its place when screwed upon the discharge of the engine or hydrant.

This device may be attached to any fire-engine or hydrant in any manner suitable, and is intended to remain there when once attached, and should be so set that the hooks or clutch is upward.

To attach hose, all that is necessary is to take the female butt H of a hose-coupling of ordinary pattern and drop it into the clutch, one of the lugs $n$ of the coupling H coming inside the hooks on either side. The swivel-nut C is then revolved to the right, drawing the sleeve D and coupling H up until the end of the inside cylinder A strikes the packing-surface $a$ of the coupling, when a water-tight joint is formed, and a perfectly smooth hole for the water to pass through is obtained. The hose is thus firmly held until it is desired to remove it, when the wheel is revolved to the left until the sleeve is pushed off to the end of the cylinder, when the coupling can be lifted out.

The cylinder A is allowed to project slightly through the sleeve D, for the purpose of catching inside of the coupling H, and act as a guide for the same.

When the hose is dropped or placed in the hooks or clutch, it is not possible for the hose to turn or fall out until removed by hand.

By this device the hose can be attached to an engine in a very few seconds, and any length of hose first at hand can be attached to it, whereas in the devices now generally in use the coupling on the hose must be purposely constructed for it. In other words, part of the device is carried on the engine, and the other on the hose-cart; while such is not the case with my device, as it is all on the engine, and ready for the first piece of hose that comes to hand.

In full-sized machines, the wheel will be set in the center of the nut, although the construction of the nut in form is immaterial, as it can be made with lugs to use spanner, or hexagon to use wrench; but the hand-wheel is the one preferred.

This device may be used as well for a suction-coupling as for coupling the hose.

Having thus fully described my invention, what I claim as new, and desire to secure by Letters Patent, is—

The combination of the cylinder A, exterior sliding sleeve D, with clutch or hooks E E, and the swivel-nut C, substantially as and for the purposes herein set forth.

In testimony that I claim the foregoing I have hereunto set my hand this 28th day of August, 1876.

PATRICK H. OWENS.

Witnesses:
L. BRADFORD LAKE,
F. A. HARDMAN.